(12) United States Patent
Kim et al.

(10) Patent No.: US 9,824,686 B2
(45) Date of Patent: Nov. 21, 2017

(54) METHOD AND APPARATUS FOR SPEECH RECOGNITION USING DEVICE USAGE PATTERN OF USER

(75) Inventors: Kyu-hong Kim, Incheon (KR); Jeong-su Kim, Yongin-si (KR); Ick-sang Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1211 days.

(21) Appl. No.: 11/878,595

(22) Filed: Jul. 25, 2007

(65) Prior Publication Data

US 2008/0167871 A1    Jul. 10, 2008

(30) Foreign Application Priority Data

Jan. 4, 2007 (KR) .................. 10-2007-0001157

(51) Int. Cl.
*G10L 15/00*    (2013.01)
*G10L 15/06*    (2013.01)
(Continued)

(52) U.S. Cl.
CPC .................................... *G10L 15/22* (2013.01)

(58) Field of Classification Search
CPC ..... G10L 15/063; G10L 15/26; G10L 15/265; G10L 15/28; G10L 15/30; G10L 15/183; G10L 15/197; G10L 2015/223; G10L 13/00; G10L 13/027
USPC .............................. 704/231–257, 270.1–275, 704/E17.001–E17.016, E15.001–E15.05, 704/270, 277; 379/88.01–88.06, 120; 455/415
See application file for complete search history.

(56) References Cited

U.S. PATENT DOCUMENTS 4,797,924 A * 1/1989 Schnars et al. ............... 704/275
4,853,953 A   8/1989 Fujisaki
(Continued)

FOREIGN PATENT DOCUMENTS

JP      7-283858      10/1995
KR   1999-0081261    11/1999
(Continued)

OTHER PUBLICATIONS

Office Action dated Sep. 23, 2008 in corresponding Korean Patent Application No. 10-2007-0001157 (4 pp).

(Continued)

*Primary Examiner* — Edgar Guerra-Erazo
(74) *Attorney, Agent, or Firm* — Staas & Halsey LLP

(57) ABSTRACT

A method and apparatus for improving the performance of voice recognition in a mobile device are provided. The method of recognizing a voice includes: monitoring the usage pattern of a user of a device for inputting a voice; selecting predetermined words from among words stored in the device based on the result of monitoring, and storing the selected words; and recognizing a voice based on an acoustic model and predetermined words. In this way, a voice can be recognized by using prediction of whom the user mainly makes a call to. Also, by automatically modeling the device usage pattern of the user and applying the pattern to vocabulary for voice recognition based on probabilities, the performance of voice recognition, as actually felt by the user, can be enhanced.

19 Claims, 8 Drawing Sheets

| Name | Tel. Number |
|---|---|
| Mom | 111-203-3043 |
| Michel Bolten | 103-033-3948 |
| Herrypotter | 439-432-4325 |
| Bread Kim | 110-3213-3424 |
| Anna | 111-333-2323 |
| Father | 333-333-2323 |
| Grand-father | 444-432-4234 |
| Kyuhong Kim | 030-303-3039 |
| Susan | 080-404-0411 |
| Nellson | 000-333-3333 |
| . | |
| . | |
| . | |
| Sujan | 001-333-3333 |

$N_T$ $N_c$

Michel Bolten
Herrypotter
Superman Kent
Bread Kim
Anna
Mom
Bread Kim
.
.
.
Bread Kim

(51) Int. Cl.
*G10L 15/18* (2013.01)
*G10L 21/00* (2013.01)
*G10L 15/22* (2006.01)

(56) References Cited

U.S. PATENT DOCUMENTS

| | | | | |
|---|---|---|---|---|
| 5,483,579 | A * | 1/1996 | Stogel | 379/88.03 |
| 5,502,774 | A * | 3/1996 | Bellegarda | G06K 9/6293 |
| | | | | 382/116 |
| 5,623,539 | A * | 4/1997 | Bassenyemukasa et al. | 379/88.02 |
| 5,704,004 | A * | 12/1997 | Li | G10L 15/02 |
| | | | | 704/219 |
| 6,199,067 | B1 * | 3/2001 | Geller | G06F 17/30702 |
| 6,249,759 | B1 * | 6/2001 | Oda | 704/222 |
| 6,260,012 | B1 | 7/2001 | Park | |
| 6,321,195 | B1 | 11/2001 | Lee et al. | |
| 6,374,221 | B1 | 4/2002 | Haimi-Cohen | |
| 6,418,328 | B1 * | 7/2002 | Shon | G10L 15/08 |
| | | | | 379/355.09 |
| 6,519,479 | B1 * | 2/2003 | Garudadri et al. | 455/563 |
| 6,570,969 | B1 * | 5/2003 | Albal et al. | 379/126 |
| 6,606,596 | B1 * | 8/2003 | Zirngibl et al. | 704/270 |
| 6,810,380 | B1 * | 10/2004 | Roberts et al. | 704/270 |
| 6,871,179 | B1 * | 3/2005 | Kist et al. | 704/275 |
| 6,925,154 | B2 * | 8/2005 | Gao | H04M 1/271 |
| | | | | 379/88.03 |
| 6,934,684 | B2 * | 8/2005 | Alpdemir et al. | 704/265 |
| 7,013,280 | B2 * | 3/2006 | Davis | G10L 15/22 |
| | | | | 704/270 |
| 7,050,550 | B2 * | 5/2006 | Steinbiss et al. | 379/88.01 |
| 7,110,948 | B1 | 9/2006 | Mekuria | |
| 7,412,036 | B1 * | 8/2008 | Charpentier et al. | 379/88.03 |
| 7,492,758 | B2 * | 2/2009 | Kusnitz et al. | 370/353 |
| 7,590,536 | B2 * | 9/2009 | Bates | G10L 15/197 |
| | | | | 704/231 |
| 7,689,420 | B2 * | 3/2010 | Paek | G10L 15/19 |
| | | | | 704/250 |
| 7,769,592 | B2 * | 8/2010 | Kemble | G10L 15/26 |
| | | | | 704/270 |
| 7,860,722 | B1 * | 12/2010 | Chow | 705/1.1 |
| 8,086,462 | B1 * | 12/2011 | Alonso et al. | 704/275 |
| 8,095,882 | B2 * | 1/2012 | Kashi | G06F 9/543 |
| | | | | 379/93.07 |
| 8,374,862 | B2 * | 2/2013 | Bocking | G10L 15/26 |
| | | | | 704/10 |
| 8,656,274 | B2 * | 2/2014 | Kashi | G06F 9/543 |
| | | | | 715/234 |
| 2001/0014146 | A1 * | 8/2001 | Beyda et al. | 379/88.25 |
| 2002/0010000 | A1 * | 1/2002 | Chern et al. | 455/517 |
| 2002/0052912 | A1 * | 5/2002 | Griswold et al. | 709/200 |
| 2002/0138265 | A1 * | 9/2002 | Stevens et al. | 704/251 |
| 2002/0159574 | A1 * | 10/2002 | Stogel | 379/93.01 |
| 2002/0178003 | A1 * | 11/2002 | Gehrke | G10L 15/30 |
| | | | | 704/246 |
| 2003/0036903 | A1 * | 2/2003 | Konopka | G10L 15/065 |
| | | | | 704/249 |
| 2004/0102957 | A1 * | 5/2004 | Levin | G06F 17/2735 |
| | | | | 704/3 |
| 2004/0148165 | A1 * | 7/2004 | Beyerlein | 704/231 |
| 2005/0075143 | A1 | 4/2005 | Choi | |
| 2006/0009974 | A1 * | 1/2006 | Junqua et al. | 704/257 |
| 2006/0010379 | A1 * | 1/2006 | Kashi | G06F 9/543 |
| | | | | 715/234 |
| 2006/0034434 | A1 * | 2/2006 | Kashi | G06F 9/543 |
| | | | | 379/93.07 |
| 2006/0074665 | A1 | 4/2006 | Astrov et al. | |
| 2006/0178882 | A1 * | 8/2006 | Braho et al. | 704/240 |
| 2006/0190256 | A1 * | 8/2006 | Stephanick et al. | 704/252 |
| 2006/0235684 | A1 * | 10/2006 | Chang | 704/233 |
| 2007/0061335 | A1 * | 3/2007 | Ramer | G06F 17/3064 |
| 2007/0071206 | A1 * | 3/2007 | Gainsboro et al. | 379/168 |
| 2007/0143100 | A1 * | 6/2007 | Agapi | G06F 17/2795 |
| | | | | 704/9 |
| 2007/0249327 | A1 * | 10/2007 | Nurmi | 455/414.1 |
| 2008/0059172 | A1 * | 3/2008 | Bocking | G10L 15/26 |
| | | | | 704/235 |
| 2008/0167871 | A1 * | 7/2008 | Kim et al. | 704/246 |
| 2008/0201147 | A1 * | 8/2008 | Han et al. | 704/254 |

FOREIGN PATENT DOCUMENTS

| | | |
|---|---|---|
| KR | 10-2005-0000989 | 1/2005 |
| KR | 10-2005-0033248 | 4/2005 |

OTHER PUBLICATIONS

Notice of Allowance dated Mar. 16, 2009 from Korean Patent Application No. 10-2005-0001157.

* cited by examiner

FIG. 5

| Name | Tel. Number |
|---|---|
| Mom | 111-203-3043 |
| Michel Bolten | 103-033-3948 |
| Herrypotter | 439-432-4325 |
| Bread Kim | 110-3213-3424 |
| Anna | 111-333-2323 |
| Father | 333-333-2323 |
| Grand-father | 444-432-4234 |
| Kyuhong Kim | 030-303-3039 |
| Susan | 080-404-0411 |
| Nellson | 000-333-3333 |
| ⋮ | |
| Sujan | 001-333-3333 |

| |
|---|
| Michel Bolten |
| Herrypotter |
| Superman Kent |
| Bread Kim |
| Anna |
| Mom |
| Bread Kim |
| ⋮ |
| Bread Kim |

$N_c$

METHOD AND APPARATUS FOR SPEECH RECOGNITION USING DEVICE USAGE PATTERN OF USER

CROSS-REFERENCE TO RELATED PATENT APPLICATIONS

This application claims the benefit of Korean Patent Application No. 10-2007-0001157, filed on Jan. 4, 2007, in the Korean Intellectual Property Office, the disclosure of which is incorporated herein in its entirety by reference.

BACKGROUND OF THE INVENTION

1. Field of the Invention

The present invention relates to voice recognition, and more particularly, to a method and apparatus for improving voice recognition performance in a mobile device.

2. Description of the Related Art

Recently, mobile devices, such as mobile phones and personal digital assistants (PDAs), are being made smaller, while the usage of memories is increasing. In addition, the number of telephone numbers that can be stored in a mobile device is continuously increasing from hundreds to thousands. An ordinary user stores all telephone numbers of acquaintances in the mobile device. In order to search for a telephone number, or to make a call, keys can be used, thereby finding the telephone number. Also, voice can be used to find the telephone number. A method of automatically dialing a telephone number in a mobile device by uttering an already registered name to the mobile device is referred to as name dialing or voice dialing. In order for a user of a mobile device to effectively use name dialing, it is essential that the voice recognition performance of the mobile device should be high.

Meanwhile, much research to improve recognition of a voice of a specific user by a device using voice recognition has been carried out. Most of this research has employed speaker adaptation, and applied a variety of techniques capable of being adapted to an acoustic model of a specific user. These methods can be broken down into a maximum a posterior (MAP) method and a maximum likelihood linear regression (MLLR) method, and methods capable of achieving high performance using just a small amount of adaptation data have been suggested. However, these methods require much computation and large memories, and thus cannot be applied easily.

FIG. 1 is a schematic block diagram illustrating a voice recognition apparatus according to conventional technology.

Referring to FIG. 1, the voice recognition apparatus 100 includes a feature extraction unit 110 extracting a feature vector from a voice sample corresponding to a user's utterance converted into a digital signal, a voice interval detection unit 120 detecting the start point and the end point of the user's utterance, a matching unit 130 matching an obtained feature vector with voice models stored in a voice model unit 140 if the start point of the voice is detected, and a determination unit 150 determining whether to accept or refuse the result of matching.

The voice recognition apparatus 100 illustrated in FIG. 1 temporarily stores a voice recognition result and a feature vector which is calculated when the voice is recognized. Then, by using the pattern of a user's manipulation of a device, the voice recognition apparatus 100 determines whether or not the result is reliable, and then, uses the result for acoustic model adaptation.

Also, like the voice recognition apparatus 100 illustrated in FIG. 1 and described above, U.S. Pat. No. 7,050,550 filed by Philips Corporation, titled, "Method for the training or adaptation of a speech recognition device", uses an acoustic adaptation method.

FIG. 2 is a schematic block diagram illustrating a voice recognition apparatus using analysis of usage patterns by user according to conventional technology.

Referring to FIG. 2, the voice recognition apparatus 200 using usage analysis of usage patterns by user includes a preprocessing unit 210 analyzing a caller's telephone number, thereby loading a personal name management (PNM) database DB 250 corresponding to the telephone number, a recognition unit 220 recognizing an uttered voice of the caller and selecting a recognition result (n-best) corresponding to the recognized word, a recognition word selection unit 230 readjusting the result n-best by using the PNM DB 250 and a recognition word selection rule, and a PNM DB management unit 240 analyzing usage patterns by caller in which the number of recognition words being used is limited, and managing the PNM DB 250 appropriately to the characteristic of each caller so that according to whether recognition is successful or not, a name is registered or deleted in an exclusion list in the PNM DB 250, and data of recognition success and failure in relation to each caller telephone number is stored and managed in the PNM DB 250.

According to the method, a list of words that are frequently mistakenly recognized in the vocabulary that is the object of recognition in relation to each user is managed and the words that were mistakenly recognized previously in the result of voice recognition are excluded.

However, this method has a drawback in that the user is continuously asked whether or not the result is correct by using voice synthesis. That is, this method requires a user's feedback in order to update information. Also, the method cannot predict whom the user will mainly make a call to, and apply the prediction result, and only words that were previously mistakenly recognized can be deleted from the vocabulary that is the object of voice recognition.

Meanwhile, in the mobile device field, enhancing the performance of voice recognition by using the conventional speaker adaptation method, that is, the method of adapting mainly an acoustic model to the characteristic of a user requires a huge amount of computation and also requires a large memory. Furthermore, if speaker adaptation is performed by using a mistakenly recognized result, the performance can lower rapidly. Accordingly, in an environment in which resources are limited, such as a mobile device environment, it is difficult to use the speaker adaptation methods using an acoustic model according to conventional technology.

SUMMARY OF THE INVENTION

The present invention provides a method and apparatus for predicting vocabulary that is the object of recognition by using the characteristic of a user's device usage, thereby enhancing the performance of voice recognition, instead of applying an acoustic model to a predetermined speaker.

According to an aspect of the present invention, there is provided a method of voice recognition in which a voice is input, a feature of the voice is extracted, and based on a predetermined acoustic model, the voice is recognized by using the extracted feature, the method including: monitoring the usage pattern of a user of a device for inputting the voice; selecting second words from among first words stored in the device based on the result of monitoring, and storing the selected words; and recognizing the voice based on the acoustic model and second words.

According to another aspect of the present invention, there is provided an apparatus for voice recognition in which a voice is input, a feature of the voice is extracted, and based on a predetermined acoustic model, the voice is recognized by using the extracted feature, the apparatus including: a monitoring unit monitoring the usage pattern of a user of a device for inputting the voice; a user word model unit selecting second words from among first words stored in the device based on the result of monitoring, and storing the selected words; and a voice recognition unit recognizing the voice based on the acoustic model and second words.

According to still another aspect of the present invention, there is provided a computer readable recording medium having embodied thereon a computer program for executing the methods.

Detailed and improved contents of the present invention are disclosed in dependent claims.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram illustrating an example of a storage structure of a phone book according to an embodiment of the present invention;

FIG. 6 is a diagram illustrating an example of a storage structure of a user word model unit according to an embodiment of the present invention;

DETAILED DESCRIPTION OF THE INVENTION

The present invention will now be described more fully with reference to the accompanying drawings, in which exemplary embodiments of the invention are shown.

Figure 1:
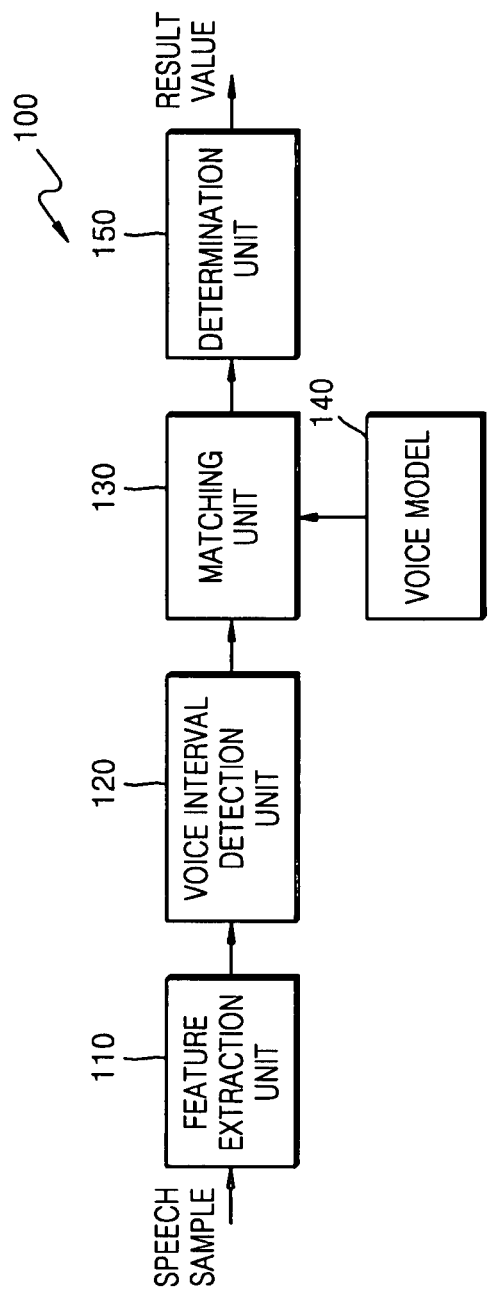
FIG. 1 is a schematic block diagram illustrating a voice recognition apparatus according to conventional technology.
Figure 2:
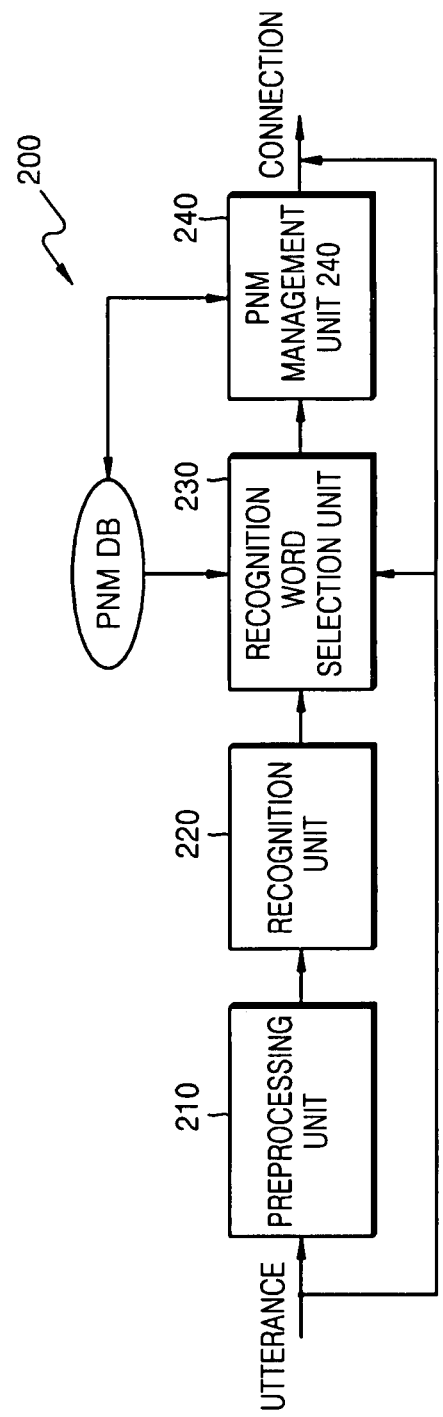
FIG. 2 is a schematic block diagram illustrating a voice recognition apparatus using analysis of usage patterns by user according to conventional technology.
Figure 3:
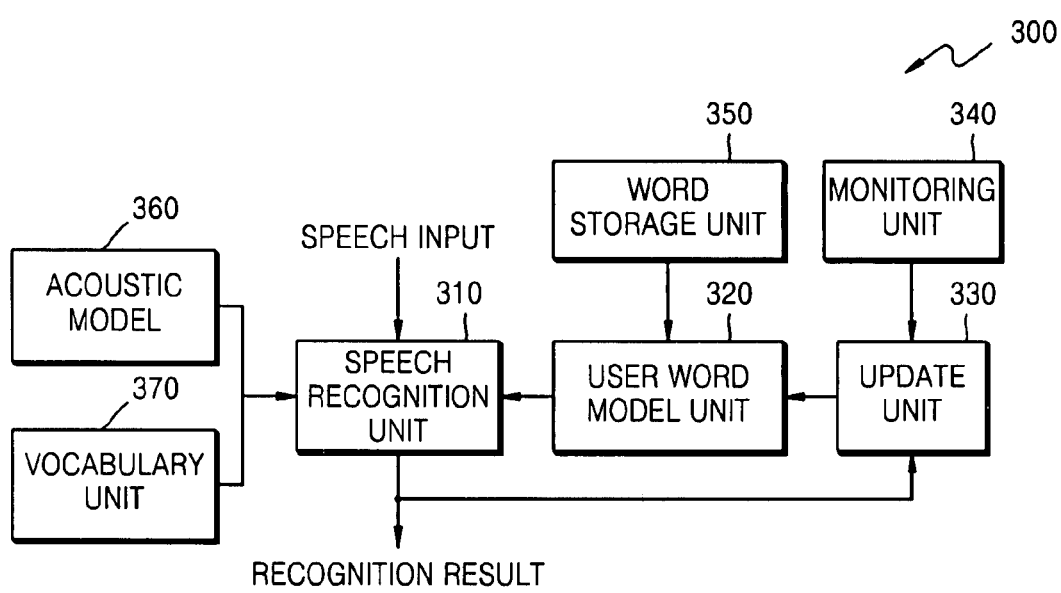
FIG. 3 is a schematic block diagram illustrating a voice recognition apparatus using a device usage pattern of a user according to an embodiment of the present invention.

FIG. 3 is a schematic block diagram illustrating a voice recognition apparatus using a device usage pattern of a user according to an embodiment of the present invention.

Referring to FIG. 3, the voice recognition apparatus 300 is composed of a voice recognition unit 310, a user word model unit 320, an update unit 330, a monitoring unit 340, a word storage unit 350, an acoustic model unit 360, and a vocabulary unit 370.

The voice recognition unit 310 receives an acoustic model appropriate to an input voice signal, from the acoustic model unit 360, and extracts a word matching the input voice, from the vocabulary unit 370, thereby recognizing the voice. The voice recognition unit 310 also includes a converter (not shown) converting an analog voice signal into a digital voice signal, and a feature extraction unit (not shown) extracting the feature of the converted voice signal.

Also, according to the current embodiment, the voice recognition unit 310 receives the probability value of a word that a user frequently uses, and performs voice recognition by using the probability value together with the acoustic model described above.

According to the device usage pattern of the user, the user word model unit 320 selects telephone numbers or names that are frequently used by the user from among telephone numbers stored in a device, and stores the numbers or names for modeling. Also, as hardware, the user word model unit 320 can be implemented as a memory, and more particularly, it can be implemented as a cache memory.

In this case, the size of the cache memory is determined by considering the adaptation speed of voice recognition. For example, when telephone numbers that the user mainly dials or receives a call from, among telephone numbers registered in a telephone, suddenly change, the performance actually felt by the user is temporarily lowered. However, as the device is used more, the performance actually felt by the user improves. In this case, if the size of the cache is big, restoration takes a longer time, but if the size of the cache is small, restoration takes a shorter time. Meanwhile, in relation to how accurately the device usage pattern of the user is modeled, an inverse relationship occurs. That is, if the size of the cache is big, the device usage pattern of the user is more accurately modeled, and if the size of the cache is small, the device usage pattern of the user is less accurately modeled.

Also, if there are many types of telephone numbers that the user frequently dials or receive a call from, the size of the cache should be big, and if there are not many types of telephone numbers, the size of the cache can be small.

The update unit 330 updates a user word model when an event of the device usage pattern of the user occurs, for example, when a call from a telephone number registered in a phone book is received, when a telephone number registered in the phone book is dialed, when a registered telephone number is searched for by using voice or a keypad when a new telephone number is registered in the phone book, or when a registered telephone number is deleted from the phone book.

Also, in addition to these events, if a voice recognition result is confirmed to match with words stored in the user word model unit 320, the update unit 330 updates the user word model unit 320.

The monitoring unit 340 monitors calls of the events described above, and calls made to or received from telephone numbers of predetermined persons. Here, the calls made to or received from telephone numbers includes calls made or received using a short message service (SMS)

message or a multimedia messaging service (MMS) message as well as connected calls for telephone conversation.

Also, the monitoring unit 340 monitors cases such as where the user searches the phone book by using a device, such as a mobile phone. Searching of the phone book includes searching the phone book for both names and telephones.

The word storage unit 350 stores predetermined words, which are stored in the device, such as a mobile phone, for example, telephone numbers and names.

The acoustic model unit 35 stores information on forms in which a voice signal can be expressed. A basic unit of this information is a phoneme or a phoneme-like unit. For example, a hidden Markov model (HMM) is a model most widely used for voice recognition. According to the HMM model, assuming that a voice signal is generated by a Markov model, parameters of a model are estimated in a training stage, and by using the estimated parameters, a model most appropriate to an unknown voice input is searched for in a recognizing unit.

The vocabulary unit 370 provides the voice recognition unit 310 with words matching a voice signal which is expressed by using a predetermined acoustic model.

Figure 4:
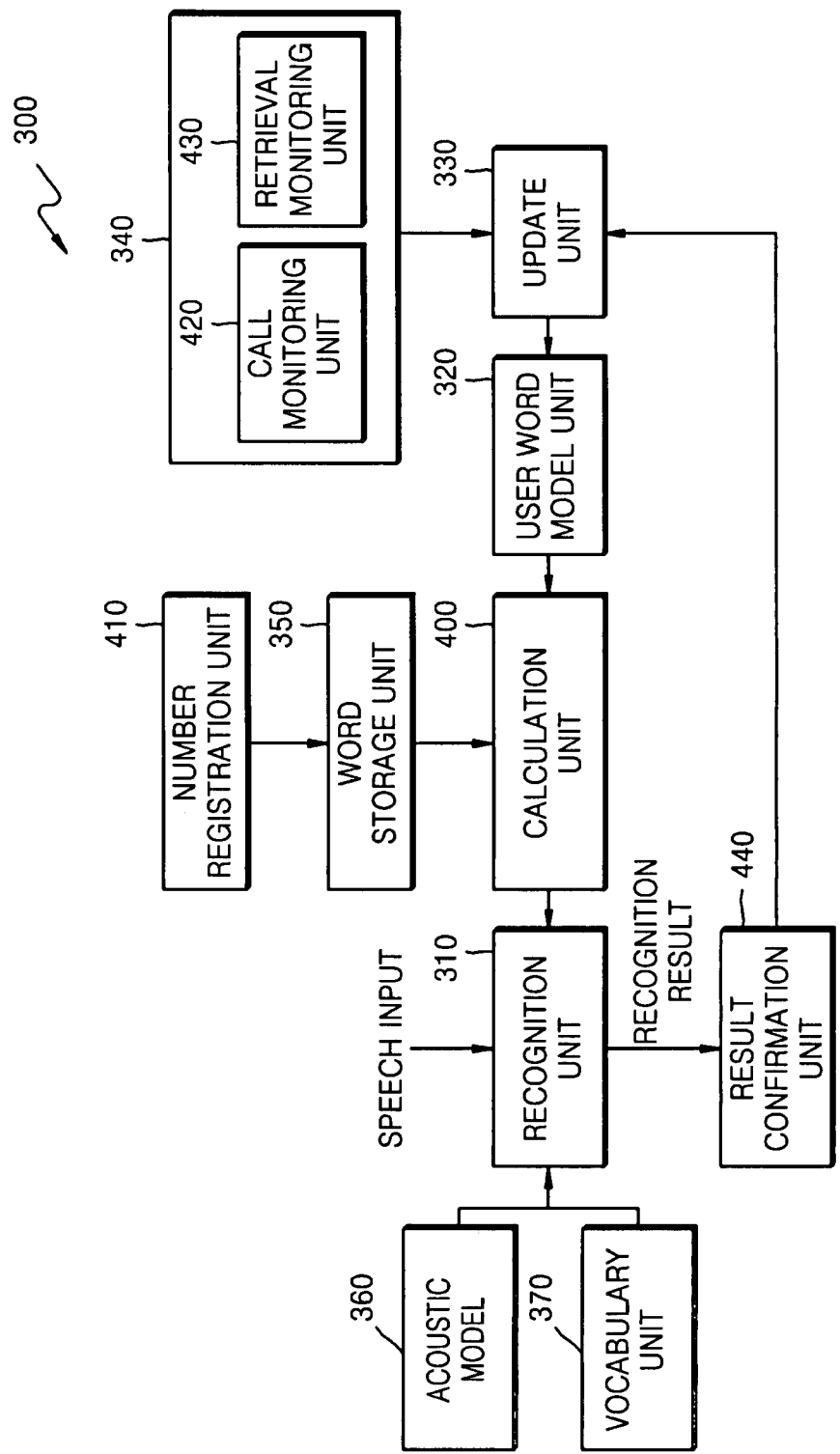
FIG. 4 is a schematic block diagram illustrating a voice recognition apparatus using a device usage pattern of a user according to another embodiment of the present invention.

FIG. 4 is a schematic block diagram illustrating a voice recognition apparatus using a device usage pattern of a user according to another embodiment of the present invention.

Referring to FIG. 4, in addition to the structure of the voice recognition apparatus 300 illustrated in FIG. 3, the voice recognition apparatus according to the current embodiment further includes a calculation unit 400, a number registration unit 410, a call monitoring unit 420, a retrieval monitoring unit 430, and a result confirmation unit 440.

The calculation unit 400 calculates the value of a probability that with a voice input which is to be input by a user through an input unit of a device, the user utters a name stored in the user word model unit 320. By using the word storage unit 350 storing words, such as names and telephone numbers, stored in a memory of the device, and the user word model unit 320, which stores names that the user frequently uses from among the words, and by modeling the names, the calculation unit 400 calculates the probability of a name stored in the user word model unit 320.

According to ordinary speaker adaptation-type voice recognition, a feature vector is extracted from a voice input, and by using the feature vector, a value having a high score in relation to a word, is thereby obtained as a recognition result. A score formula for identifying a word (w) corresponding to an input voice vector (x) is given by equation 1 below.

$$\text{score}(w) = P(w|x) \quad (1)$$

If this value is calculated with respect to each word, and the result is arranged, the voice recognition result can be obtained.

If Bayes rule is applied to equation 1 and the result is expanded, the result is given by equation 2 below.

$$P(w|x) = \frac{P(x|w)P(w)}{P(x)} \quad (2)$$

Here, P(x) is independent of w, and even if P(x) is removed from equation 2, it does not affect retrieval or recognition results. Accordingly, in the case of voice recognition, the final expression is argmax{P(x|w)P(w)}. Since in an ordinary isolated word recognizing apparatus, the probability of P(w) is assumed to have a uniform distribution characteristic, it is not considered in recognition of an isolated word or in retrieval by using voice. However, the isolated word recognition is recognizing the utterance of only one word, and is appropriate for applications, such as voice recognition-based name retrieval or name dialing according to the current embodiment.

According to the current embodiment, the performance of name retrieval or name dialing based on voice recognition can be enhanced by using the telephone usage pattern of the user. A methodology of voice recognition or retrieval according to the method is expressed by equation 3 below.

$$\tilde{w} = \underset{w \in W}{\operatorname{argmax}} P(w|x, u) \quad (3)$$

That is, it is assumed that user information (u) is additionally given. If this is expanded according to the Bayes rule and a part independent of w is removed, the result is given by equation 4 below.

$$\tilde{w} = \underset{w \in W}{\operatorname{argmax}} P(x|w, u) P(w|u) \quad (4)$$

Here, P(x|w,u) is a probability that when a speaker-adapted word model exists, a feature vector (x) appears, and P(w|u) is a probability that when a speech recognition user is u, a word w is uttered. In this case, when the value P(w|u) is calculated, the calculation is not dependent on a predetermined recognition apparatus.

Here, in the case of an HMM-based recognition apparatus, the value P(w|u) is a likelihood score of a word model, and in a pattern matching method, such as dynamic time warping (DTW) that is a voice recognition algorithm, the value P(w|u) can be expressed as a value which is inversely proportional to a matching distance.

Also, selectively, a speaker-dependent model or a speaker-independent model can be used. Here, the speaker-dependent model requires a process in which speech of a predetermined speaker is recognized and a user inputs his or her voice to train a recognition apparatus. The speaker-independent model does not require this process, and can use an HMM- or neural network (NM)-based voice recognition algorithm.

Furthermore, a speaker-adaptation model may be formed by using a maximum a posterior (MAP) technique or a maximum likelihood linear regression (MLLR)-based speaker adaptation technique. In order to perform voice recognition or retrieval by applying a user word model according to the current embodiment, equation 5 below is used.

$$\text{score}(w) = \log P(x|\theta_w) + \alpha_u \log P(w|u) \quad (5)$$

Here, $\theta_w$ is a speaker-independent acoustic model or a speaker-dependent acoustic model, and $\alpha_w$ is a weight of a user model.

In order to calculate a user-based word probability, a cache memory is used to track the recent statistics in relation to the recent telephone usage of the user, and from the statistics, a word probability is calculated as given by equation 6 below.

$$P(w|u) = (1 - \lambda_{cache}) P(w) + \lambda_{cache} \cdot P(w|\text{cache}) \quad (6)$$

Equation 6 is an expression of a user-based word probability according to the current embodiment. Since P(w) is the probability of a stored word, it has a constant value. That is, if the number of registered words is $N_T$, the word probability can be expressed by equation 7 below.

$$P(w) = \frac{1}{N_T} \quad (7)$$

Since P(w|cache) reflects the usage pattern of the user, it is a value dependent on the telephone usage of the user. In equation 6, $\lambda_{cache}$ is a weight with respect to the degree of reflecting a user-based word probability, and has a value greater than 0 and less than 1. If the value is 0, the P(w|u) value in equation 6 is P(w) which is the same as the value used in the conventional name dialing, and therefore, the result will be the same as that of the conventional method.

Calculation of P(w|cache) is expressed by a ratio of an appearance frequency of a word registered in the cache. That is, if $N_c$ words in the recent list are stored in the cache and the word w is stored $N_w$ times, the cache probability in relation to the word w is expressed by equation 8 below.

$$P(w | \text{cache}) = \frac{N_w}{N_c} \quad (8)$$

Accordingly, if equations 7 and 8 are combined, the user-based word probability can be calculated.

The number registration unit 410 performs a function by which the user registers a new telephone number in the phone book of the device or deletes a registered telephone number. That is, the number registration unit 410 performs storage of the registration or deletion of information, together with the word storage unit 350.

The call monitoring unit 420 monitors calls of the user, that is, a telephone number which the user dials or from which a call is received, and provides the information to the update unit 330. If the user retrieves a predetermined name or telephone number from the phone book of the device, the retrieval monitoring unit 430 monitors the retrieved telephone number, and provides the information to the update unit 330 in the same manner as the call monitoring unit 420.

The result confirmation unit 440 determines whether or not the voice recognition result of the voice recognition unit 310 matches with words stored in the user word model unit 320. If it is determined that the result matches with the words, the recognized word is updated in the user word model unit 320.

FIG. 5 is a diagram illustrating an example of a storage structure of a phone book according to an embodiment of the present invention.

As illustrated in FIG. 5, the phone book has a structure in which names next to their corresponding telephone numbers are sequentially stored, and the total number of registered telephone numbers of the phone book is defined as $N_T$. The total number of telephone numbers is used to obtain the probability of P(w) by using equation 7 as described above.

FIG. 6 is a diagram illustrating an example of a storage structure of a user word model unit according to an embodiment of the present invention.

Referring to FIG. 6, examples of the user word model are illustrated. In order to reduce a memory space used by the names and telephones illustrated in FIG. 5, only matching names are sequentially stored. The total number of user word models is defined as $N_C$. The total number of user word models is used for calculation of P(w|cache).

Also, by selectively storing only a pointer corresponding to a name, waste of memory can be reduced. Also, the memory for storing the user word models may be a cache memory, and if the memory space is completely filled by stored items, previous contents may be deleted by being overwritten in the order of oldest items first.

FIGS. 7 through 11 illustrate embodiments of updating user word models. According to the embodiments, when a user receives a call, it is determined whether or not the telephone number the call from which is received is registered. Then, if it is determined that the telephone number is a registered one, the user name corresponding to the telephone number is updated in the user word model. Also, when the user makes a call to a telephone number registered in the phone book, the user name corresponding to the telephone number is updated in the user word model.

Also, when a registered telephone number is retrieved by using voice or keypad, the user word model is updated. When a new telephone number is registered in the phone book, the name and the corresponding telephone number are stored together, and the total number ($N_T$) of the word storage unit is increased by 1.

Figure 7:
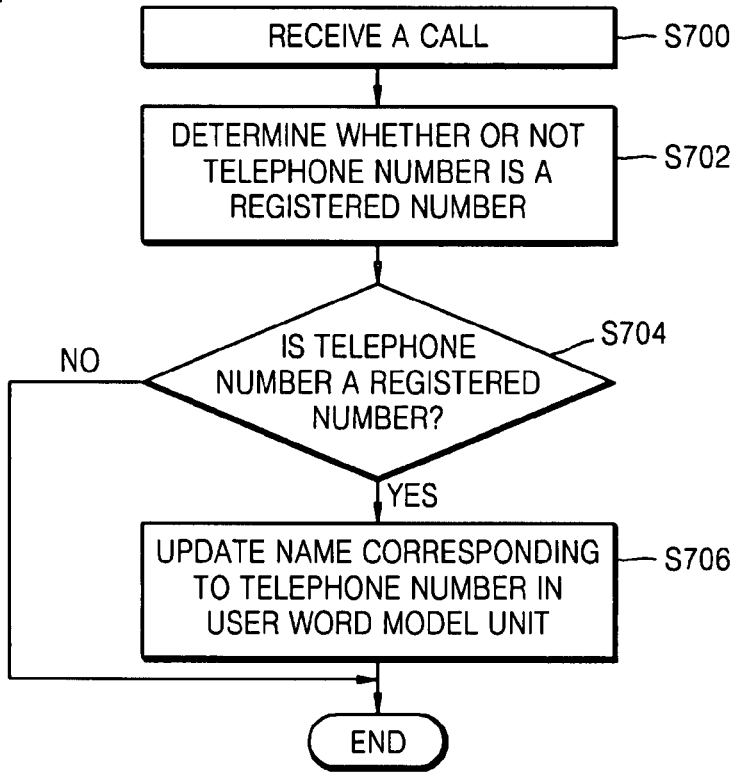
FIG. 7 is a flowchart of a method of updating a user model unit according to an embodiment of the present invention.

FIG. 7 is a flowchart of a method of updating a user model unit according to an embodiment of the present invention.

Referring to FIG. 7, a call to a user is received in operation 700. In operation 702, it is determined whether or not the telephone number of the caller is a telephone number registered in the phone book. In operation 704, if the caller's telephone number is a registered telephone number, the name corresponding to the telephone number is updated in the user word model unit 320.

Figure 8:
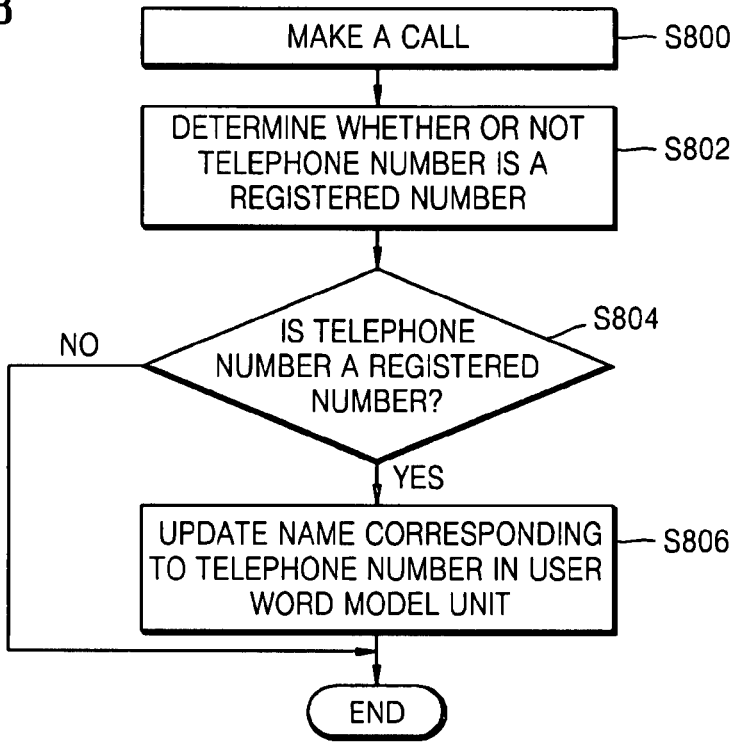
FIG. 8 is a flowchart of a method of updating a user model unit according to another embodiment of the present invention.

FIG. 8 is a flowchart of a method of updating a user model unit according to another embodiment of the present invention.

Referring to FIG. 8, a user makes a call in operation 800. In operation 802, it is determined whether or not the telephone number to which the call is made is a telephone number registered in the phone book. In operation 804, if the called telephone number is a registered telephone number, the name corresponding to the telephone number is updated in the user word model unit 320.

Figure 9:
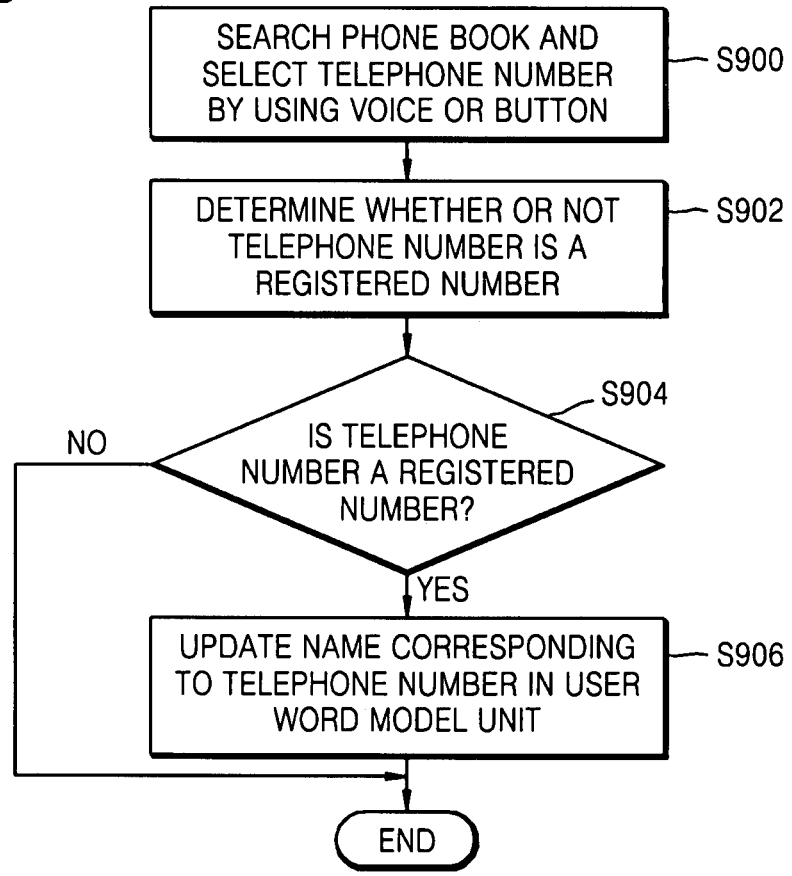
FIG. 9 is a flowchart of a method of updating a user model unit according to another embodiment of the present invention.

FIG. 9 is a flowchart of a method of updating a user model unit according to another embodiment of the present invention.

Referring to FIG. 9, in operation 900, a user searches the phone book by using voice or predetermined buttons of the device. Here, the phone book corresponds to the word storage unit 350 according to an embodiment of the present invention. In operation 902, it is determined whether or not the searched for telephone number is a telephone number registered in the word storage unit 350. In operation 904, if the searched for telephone number is a registered telephone number, the name corresponding to the telephone number is updated in the user word model unit 320 in operation 906.

Figure 10:
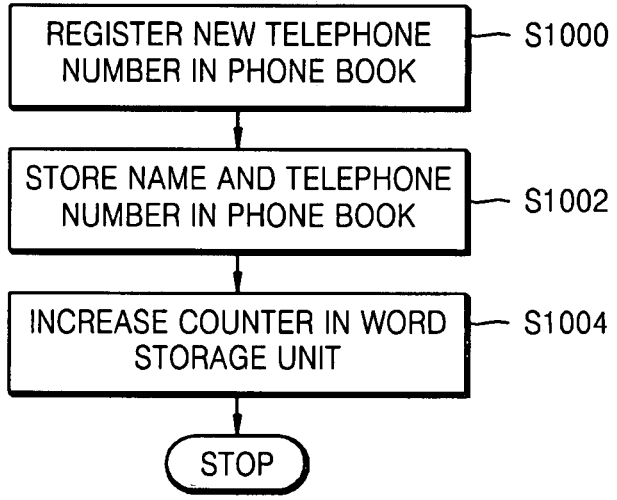
FIG. 10 is a flowchart of a method of updating a user model unit according to another embodiment of the present invention.

FIG. 10 is a flowchart of a method of updating a user model unit according to another embodiment of the present invention.

Figure 11:
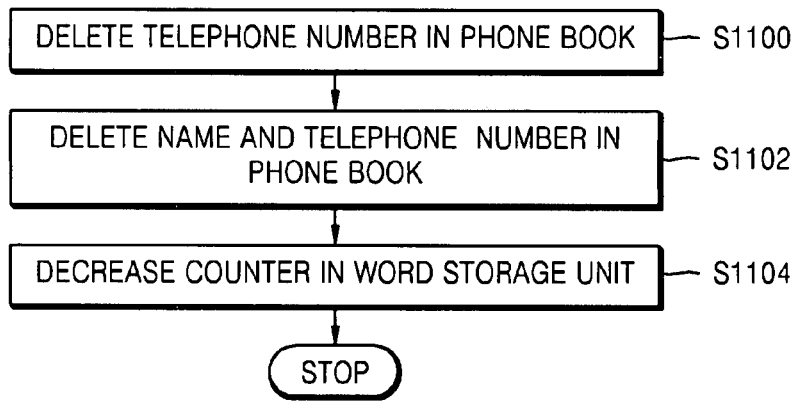
FIG. 11 is a flowchart of a method of updating a user model unit according to another embodiment of the present invention.

In operation 1000, a user registers a new telephone number in a phone book by using a device. Then, in operation 1002, the name and telephone number are stored in the phone book. In operation 1004, the total number of words stored in the word storage unit 350, that is, $N_T$, is increased by 1. A process for deleting a telephone number illustrated in FIG. 11 is performed in the same manner as the process for registering a telephone number illustrated in FIG. 10. When a telephone number is deleted, the total number of words in the word storage unit 350 is decreased by 1.

Figure 12:
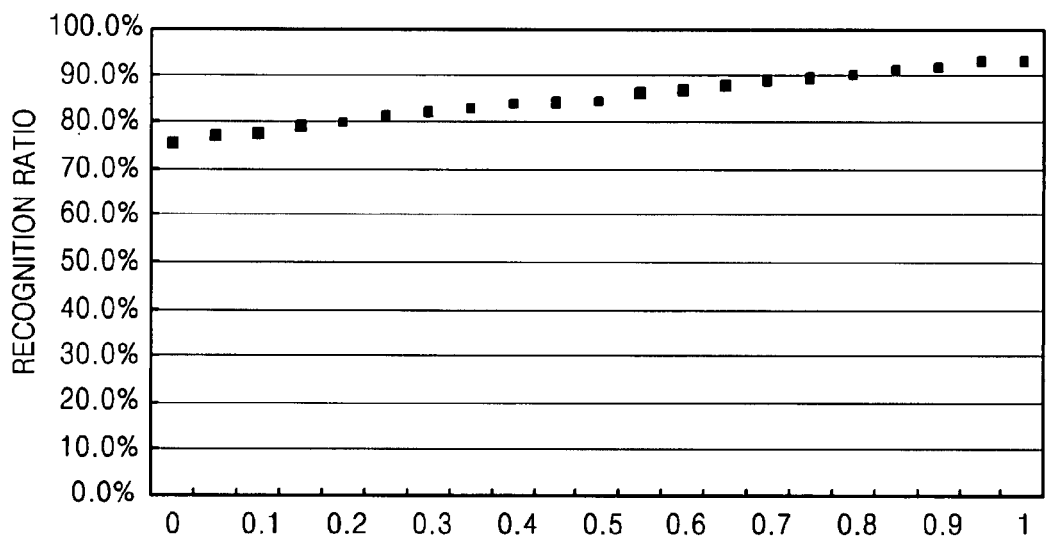
FIG. 12 is a diagram illustrating an example of recognition performance according to an embodiment of the present invention.

FIG. 12 is a diagram illustrating an example of recognition performance according to an embodiment of the present invention;

Referring to FIG. 12, the horizontal axis indicates a probability that a word stored in the user word model illustrated in FIG. 6 is uttered, and the vertical axis indicates the performance of recognition. In general, since in the whole vocabulary that is the object of recognition, the words that are actually frequently used are limited, the probability that words stored in the user word model are uttered is high. Accordingly, the performance of voice recognition according to the present invention is much better than that of the conventional method.

According to the present invention as described above, the usage pattern of a user of a device for inputting voice is monitored, predetermined words from among words stored in the device are selected based on the result of monitoring, and then, are stored, and based on an acoustic model and predetermined words, a voice is recognized. In this way, a voice can be recognized by using a prediction of who the user mainly calls. Also, by automatically modeling the device usage pattern of the user and applying the pattern to vocabulary for voice recognition based on probabilities, the performance of voice recognition, as actually felt by the user, can be enhanced.

Furthermore, in a mobile device, while reducing battery consumption, the performance of voice recognition can be effectively enhanced with less computation.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of voice recognition by a device to which voice is input, the method comprising:
   monitoring, by the device, whether a telephone number registered in the device is used;
   updating, by the device, a word model by storing a name corresponding to the used telephone number; and
   recognizing, by the device, a word corresponding to the input voice using the updated word model and a predetermined acoustic model.

2. The method of claim 1, wherein the word model is selected according to a usage pattern of a user.

3. The method of claim 1, wherein the monitoring of whether a telephone number registered in the device is used further comprises monitoring whether a user makes a call to a predetermined telephone number by using the device, and
   in the updating of the word model, if the telephone number to which the call is made matches a telephone number stored in a first storage of the device, a name corresponding to the called telephone number is selected from a plurality of words corresponding to the telephone numbers in the device and the name is stored.

4. The method of claim 1, wherein the monitoring of whether the telephone number registered in the device is used further comprises monitoring whether a user receives a call from a predetermined telephone number by using the device, and
   in the updating of a word model, if the telephone number from which the call is received matches a telephone number stored in a first storage of the device, a name corresponding to the telephone number is selected from a plurality of words corresponding to the telephone numbers in the device and the name is stored.

5. The method of claim 1, wherein the monitoring of whether a telephone number registered in a device is used further comprises monitoring whether a user searches for a predetermined telephone number by using the device, and
   in the updating of a word model, if the searched for telephone number matches a telephone number stored in a first storage of the device, a name corresponding to the called telephone number is selected from a plurality of words corresponding to the telephone numbers in the device and the name is stored.

6. The method of claim 1, after the recognizing of a word corresponding to the voice, further comprising determining whether a result of the voice recognition matches the word model,
   wherein according to a result of determining, the word model are updated.

7. The method of claim 1, wherein the monitoring of whether a telephone number registered in the device is used comprises calculating the probability values of the word model that is to be input as the voice, and
   in the recognizing of a word corresponding to the voice, the voice is recognized based on the probability value.

8. The method of claim 1, wherein the telephone number and a name corresponding to the telephone number are stored in a predetermined memory corresponding to a phone book of the device.

9. The method of claim 1, wherein the word model is a name stored in a predetermined memory of the device.

10. The method of claim 9, wherein the memory is a cache.

11. The method of claim 1, wherein in the storing of the name corresponding to the used telephone number, if a new telephone number is registered in a phone book of the device, the number of telephone numbers registered in the phone book is increased, and the word model is selected from a plurality of words corresponding to the telephone numbers.

12. The method of claim 1, wherein in the storing of the name corresponding to the used telephone number, if a telephone number stored in a phone book of the device is deleted, the number of telephone numbers in the phone book is decreased, and the word model is selected from a plurality of words corresponding to the telephone numbers in the device.

13. At least one non-transitory computer readable recording medium comprising computer readable instructions that control at least one processor to implement the method of any one of claims 1 through 5, 8 through 9 and 10 through 12.

14. A device for voice recognition to which voice is input, the device comprising:
   a processor, configured:
   to monitor whether a telephone number registered in a device is used;
   to update a word model by storing a name corresponding to the used telephone number; and
   to recognize a word corresponding to the input voice using the updated word model and a predetermined acoustic model.

15. The device of claim 14, wherein the processor is configured to monitor whether a user makes a call to or receives a call from a predetermined telephone number by using the device, and
   if the telephone number to which the call is made or from which the call is received, matches a telephone number stored in a first storage of the device, the processor is configured to select a name corresponding to the calling telephone number from a plurality of words corresponding to telephone numbers stored in the first storage and stores the name.

16. The device of claim 14, wherein the processor is configured to monitor whether the user searches for a predetermined telephone number by using the device, and
   if the searched for telephone number matches a telephone number stored in a first storage of the device, the processor is configured to select a name corresponding to the searched for telephone number from a plurality of words corresponding to telephone numbers stored in the first storage and stores the name.

17. The device of claim 14, wherein the processor is further configured to determine whether a result of the voice recognition matches the sword model, and
   the processor is configured to update the word model according to a result of determining.

18. The device of claim 14, wherein
   the processor is configured to register a new telephone number in a first storage or delete a registered telephone number from the first storage.

19. The device of claim 14, wherein the device is a mobile device.

* * * * *